Dec. 4, 1951   E. K. KARLSSON ET AL   2,577,331
DEFLECTOR FOR WAGON ELEVATORS
Filed Feb. 23, 1950
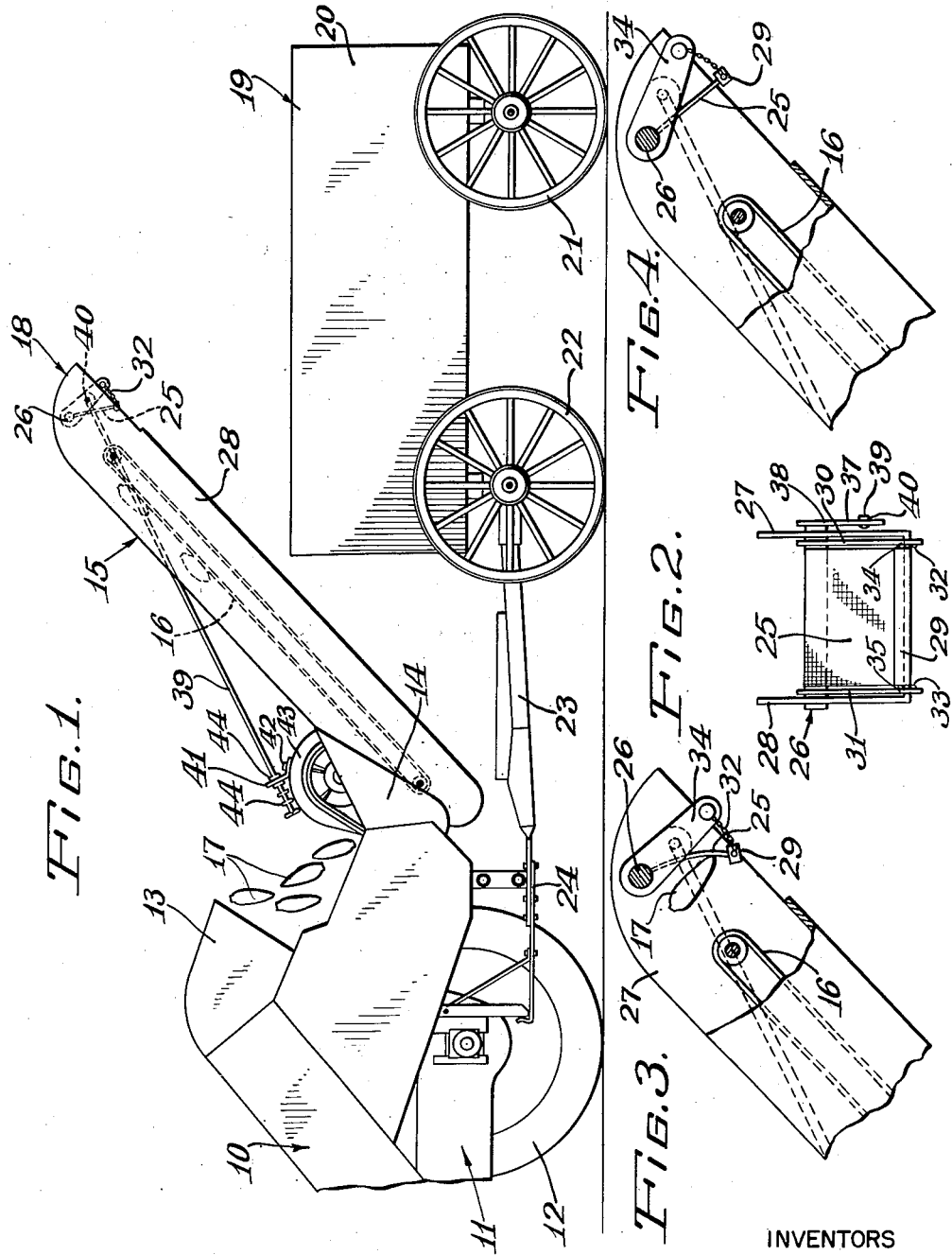
INVENTORS
ELOF K. KARLSSON
JOHN L. AASLAND
Paul O. Pippel
Atty.

Patented Dec. 4, 1951

2,577,331

UNITED STATES PATENT OFFICE 2,577,331

DEFLECTOR FOR WAGON ELEVATORS

Elof K. Karlsson and John L. Aasland, Moline, Ill., assignors to International Harvester Company, a corporation of New Jersey Application February 23, 1950, Serial No. 145,866

5 Claims. (Cl. 198—65)

This invention relates to a new and improved deflector for wagon elevators and is used more particularly for the wagon elevators of corn pickers.

The purpose of a wagon elevator is to convey crops from a harvesting implement to a trailing wagon. A trailing wagon has considerable length and it is necessary to deliver the harvested grain evenly throughout that length in order to properly fill the wagon. The present application is concerned with the delivery of harvested ears of corn from a wagon elevator to a trailing wagon. In order to deliver the corn throughout the length of the wagon, deflectors on the elevator are a necessary attachment. There have been many forms of deflectors utilized and yet there is a definite need for a wagon elevator deflector which will not injure or cause damage to the corn and yet may be adjustable so that the trajectory of the corn may be varied throughout numerous increments of changes for the purpose of depositing corn in any desired portion of the wagon.

Is is therefore a principal object of this invention to provide a deflector for wagon elevators which is sufficiently yieldable in its make-up so as not to cause damage to the material being elevated and discharged to a trailing wagon.

Another important object of this invention is to supply a wagon elevator with an angularly adjustable deflector for the purpose of varying the effective range of throw of the material being elevated thereby.

A still further important object of this invention is the provision of a flexible deflector for wagon elevators capable of simultaneously yielding to minimize damage to ears of corn and to direct said ears of corn to various positions along the length of a trailing wagon.

A still further important object of this invention is to provide a hinged canvas type deflector for use in the upper ends of wagon elevators having weight means to normally hold the deflector extended and adjustable means to vary the angle of disposition of the canvas deflector within the upper end of an ear corn wagon elevator.

Other and further important objects of this invention will become apparent from the disclosures in the following specification and accompanying drawing.

In the drawing:

Figure 1 is a side elevational view of the mechanism employing the wagon elevator deflector of this invention.

Figure 2 is an end view of the upper portion of the wagon elevator as shown in Figure 1.

Figure 3 is a detail side elevational view with portions broken away showing the upper end of the wagon elevator of Figures 1 and 2 in which an ear of corn is shown striking the canvas deflector.

Figure 4 is a view similar to Figure 3 in which the deflector is adjustably positioned at a different angle.

As shown in the drawing:

Reference numeral 10 indicates generally a corn picker harvester mounted on a tractor 11 having large rear traction wheels 12. The operating mechanism of the corn picker is not shown in detail but the harvested ears of corn are discharged from a rearwardly extending spout 13 and are adapted to fall down into a hopper 14 adjoining a wagon elevator 15. A conveyor 16 is adapted to elevate ears of corn designated by the numeral 17, received from the hopper 14 upwardly and rearwardly to a discharge end 18 of the wagon elevator 15 and thereupon be dropped into a relatively long trailing wagon 19. The trailing wagon includes a box portion 20, rear wheels 21, front wheels 22, and a forwardly extending tongue 23 adapted to be fastened to the tractor draw-bar 24.

The discharge end 18 of the wagon elevator 15 includes a curtain-type canvas deflector 25 hinged on a shaft or rod member 26 journaled in the upper ends of side sheets 27 and 28 of the wagon elevator as best shown in Figure 2. The deflector curtain 25 is preferably made of a canvas or other flexible material which will not injure ears of corn as they strike the curtain. As shown in Figure 1 the deflector curtain 25 is inclined substantially vertically so that the ears of corn striking thereagainst will be deflected downwardly into the forward end of the wagon box 20. Figure 3 shows an ear of corn 17 leaving the elevator conveyor 16 and striking the convas curtain 25. The curtain has yielded to the shape of the ear of corn insuring that there will be no damage to the kernels of corn thereon.

A weight 29 is contained within a lower hem of the canvas curtain and thus by gravity the curtain will remain extended in substantially vertical position unless otherwise adjusted. The shaft 26 is provided with depending integral spaced apart arms 30 and 31 located between the side sheets 27 and 28. As the rod 26 is rotated within its journal support, the arms 30 and 31 thus swing through a similar degree of angular movement. Chains 32 and 33 are fastened to the lower ends of the arms 30 and 31 at 34 and 35. The other ends of the chains 32 and 33 are connected to the ends of the weight member 29 located at the lower edge of the canvas curtain 35.

The rod 26 has a lateral extension 36 beyond the side plate 27. An actuating arm 37 is welded or otherwise fastened to the rod extension 36 at 38 in a manner similar to the arms 30 and 31. A link member 39 is hingedly attached to the depending arm 37 at 40 and extends forwardly and downwardly to a locking bracket 41 mounted at 42 to the top of a fan housing 43 which in turn forms part of the corn picker 10. Stops 44 are fastened at intervals along the end of the connecting link 39 and are adapted to engage the locking bracket 41 for various adjustment of the operating arm 37. The rod 39 as shown in Figure 1 is in substantially its lowermost position permitting the canvas 25 to remain substantially vertical. As the rod 39 is pushed upwardly and rearwardly it may be held in any desired position by one of the lower positioned stops 44 in the bracket 41 as shown in Figure 4 the canvas curtain 25 is angularly disposed upwardly and rearwardly so that ears of corn discharged from the conveyor 16 will be deflected toward the rear portion of the wagon box 20 and thus the wagon may be loaded uniformly throughout its length merely by the operator changing the angular disposition of the canvas curtain 25.

In operation the canvas curtain is adjusted throughout its angular range of movement by an upward and rearward movement of the link 39 which changes the angular position of the depending arm 37 of the rod 26. The chains 32 and 33 joining the lower ends of the arms 30 and 31 with the canvas curtain act to raise the curtain directly in response to angular change of movement of the arm 37. It will thus be seen that the canvas deflecting curtain of this invention performs its primary function of deflecting ears of corn to any desired position along the length of the wagon box and yet in all positions of adjustment the canvas deflector is yieldable and thus not injurious to the ears of corn by reason of its inherent flexible nature and further in view of the fact that the canvas is held in adjusted position by collapsible chains 32 and 33. Ears of corn may thus be properly delivered from a corn harvesting machine to a trailing wagon.

Various details of construction may be changed throughout a wide range without departing from the principles disclosed herein, and we therefore do not propose limiting the patent granted hereon otherwise than as necessitated by the appended claims.

What is claimed is:

1. A deflector for wagon elevators of the type having an upwardly and rearwardly inclined conveyor within a housing having spaced side sheets comprising a shaft extending across and journaled for rotational movement in said side sheets, a flexible curtain fastened to said shaft, means for adjusting the angular disposition of said flexible curtain, said means for adjusting the curtain including a pair of spaced apart arms fixed to said shaft and inclined downwardly and rearwardly spaced from said curtain, and flexible means joining the lower end of said curtain to the lower end of each arm whereby rotation of the shaft causes an arcuate movement of the arms and a corresponding movement of the curtain.

2. A deflector as set forth in claim 1 in which the shaft extends outside one of said side sheets, an operating arm fastened to said shaft extension, and link means joining said operating arm for remote rotation of said shaft.

3. A deflector as set forth in claim 2 in which lock means is provided to hold the link means in adjusted position.

4. A deflector for wagon elevators of the type having an upwardly and rearwardly inclined conveyor within a housing having spaced side sheets comprising a shaft extending across and journaled for rotation in said side sheets, a canvas curtain fastened to said shaft between said side sheets and disposed adjacent the upper end of the elevator conveyor to act as a cushion for the material discharged from the conveyor and being deflected to a trailing wagon, a weight member in the lower end of said canvas curtain to maintain it in extended position, and means for varying the angular disposition of said canvas curtain.

5. A deflector as set forth in claim 4 in which the means for varying the angular disposition of the curtain comprises spaced apart arms fastened to said shaft in an angularly inclined position spaced rearwardly of said curtain, said arms located on said shaft adjacent the inner side of each of said side sheets, flexible chain means joining the lower ends of the arms to the lower weighted end of the curtain, said shaft having an extension beyond one of said side sheets, an operating lever arm fastened to said shaft extension, and link means attached to the end of said operating lever arm whereby longitudinal movement of said link means at some remote position will directly change the angular positioning of the canvas curtain for cushioned deflection of material discharged from said elevator conveyor as it is deposited throughout various positions along the length of a trailing wagon.

ELOF K. KARLSSON.
JOHN L. AASLAND.

REFERENCES CITED

The following references are of record in the file of this patent:

UNITED STATES PATENTS

| Number | Name | Date |
|---|---|---|
| 57,008 | Stone | Aug. 7, 1866 |
| 409,377 | Stambaugh | Aug. 20, 1889 |
| 923,064 | Morenus | May 25, 1909 |
| 1,114,454 | Petrow | Oct. 20, 1914 |
| 1,847,433 | Krause | Mar. 1, 1932 |